E. & S. C. KATZINGER.
BAKING PAN.
APPLICATION FILED MAR. 25, 1916.

1,229,282.

Patented June 12, 1917.
3 SHEETS—SHEET 1.

Inventors:
Edward Katzinger,
Sidney C. Katzinger.

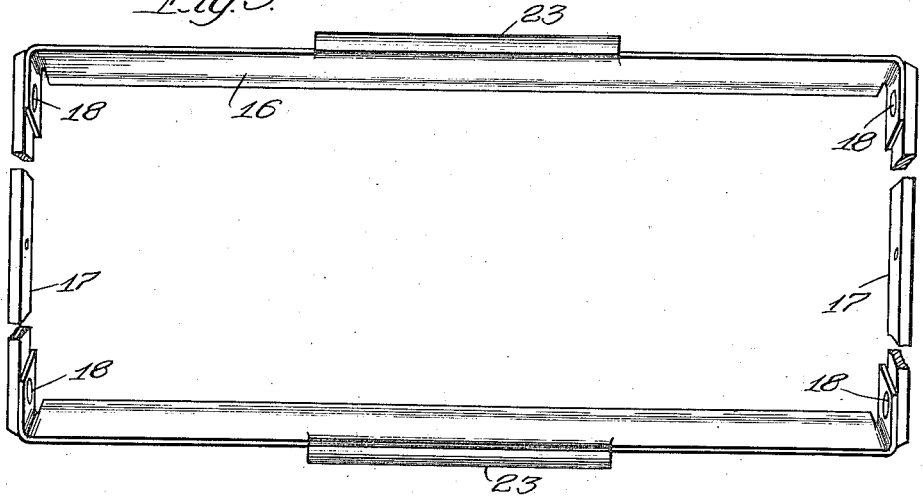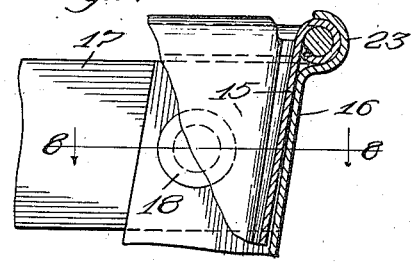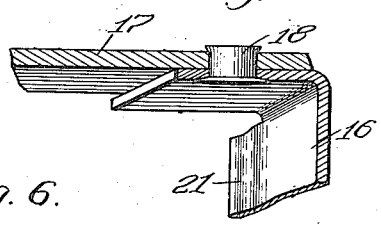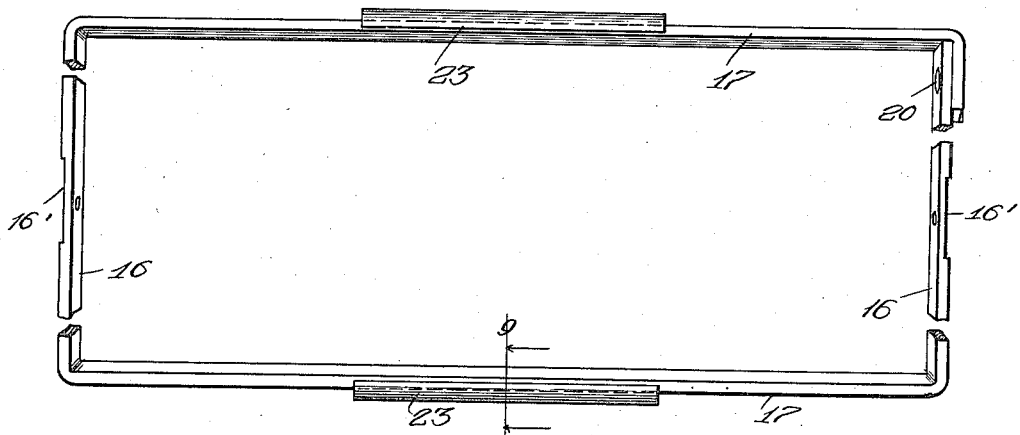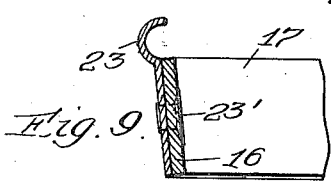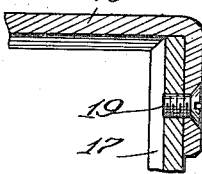

E. & S. C. KATZINGER.
BAKING PAN.
APPLICATION FILED MAR. 25, 1916.
1,229,282.
Patented June 12, 1917.
3 SHEETS—SHEET 3.
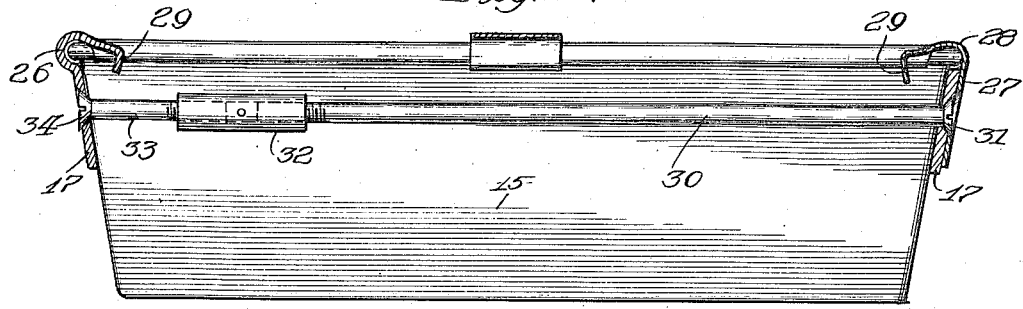
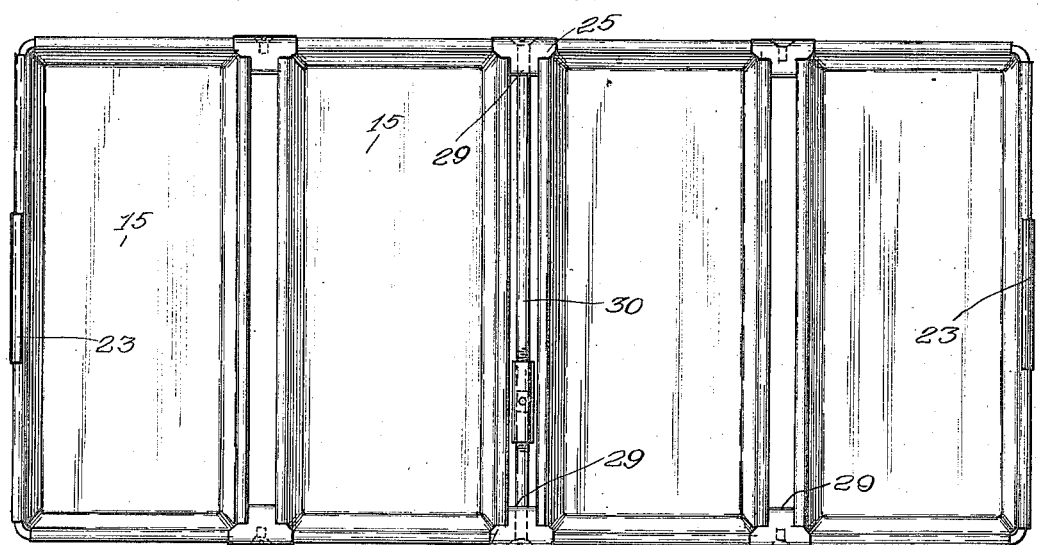
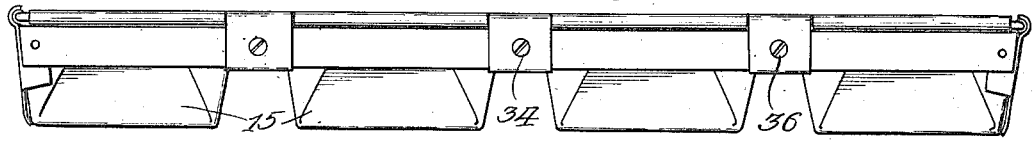
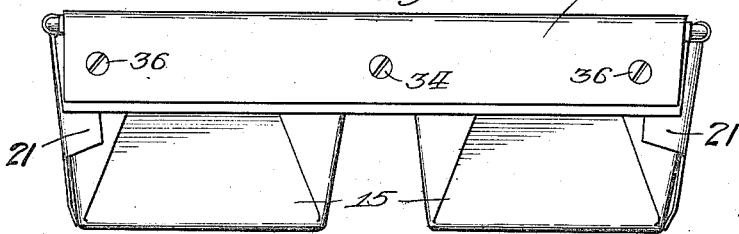
Witness:
R. L. Farrington
Inventors:
Edward Katzinger,
Sidney C. Katzinger,
By Brown, Nissen & Sprinkle
Attys.

UNITED STATES PATENT OFFICE.

EDWARD KATZINGER AND SIDNEY C. KATZINGER, OF CHICAGO, ILLINOIS, ASSIGNORS TO EDWARD KATZINGER COMPANY, OF CHICAGO, ILLINOIS, A CORPORATION OF ILLINOIS.

BAKING-PAN.

1,229,282.  Specification of Letters Patent.  Patented June 12, 1917.

Application filed March 25, 1916. Serial No. 86,534.

*To all whom it may concern:*

Be it known that we, EDWARD KATZINGER and SIDNEY C. KATZINGER, citizens of the United States, residing at Chicago, in the county of Cook and State of Illinois, have invented certain new and useful Improvements in Baking-Pans, of which the following is a specification.

Our invention relates to baking pan constructions, and has for its object, the provision of a simple and efficient baking pan construction in which a series of indivdual pans are held together in a manner so that one or more of the individual pans can be easily and quickly taken from the series and said pan or pans, or other new pans be inserted in the series. A further object is the provision of means for holding the individual pans of the series in rigid spaced relations. Other objects will appear hereinafter.

An embodiment of our invention is shown in the accompanying drawings forming a part of this specification and in which:—

Fig. 5 is a plan view of a frame embodying our invention.

Fig. 6 is a similar view of a slightly modified form of frame.

Fig 7 is an enlarged fragmental detail showing a corner portion of our baking pan construction.

Fig. 8 is a section taken on line 8—8 in Fig. 7.

Fig. 9 is a fragmental detail showing a corner of the frame shown in Fig. 6.

Fig. 10 is a fragmental section showing a modified form of means for securing the frame portions together.

Fig. 11 is a view similar to Fig. 2 showing some modified forms of parts.

Fig. 12 is a series of pans showing a slightly modified form of holding them in the frame.

Fig. 13 is a side elevation of the same; and,

Fig. 14 is a side elevation of the form shown in Fig. 11 looking as from the right hand side of said figure.

Our improvement is designed to be embodied in baking pan constructions in which there are a series of individual baking pans secured together to facilitate handling. Such series of baking pans contain two or more individual baking pans which are held together in some convenient manner. Previously they have been rigidly secured together, and it is the purpose of our invention now, to provide means for removably holding the pans in the frame so that if it is desired to remove or replace one or more of the individual pans, the same can be accomplished by a baker or other person of very little mechanical ability.

Figure 1:
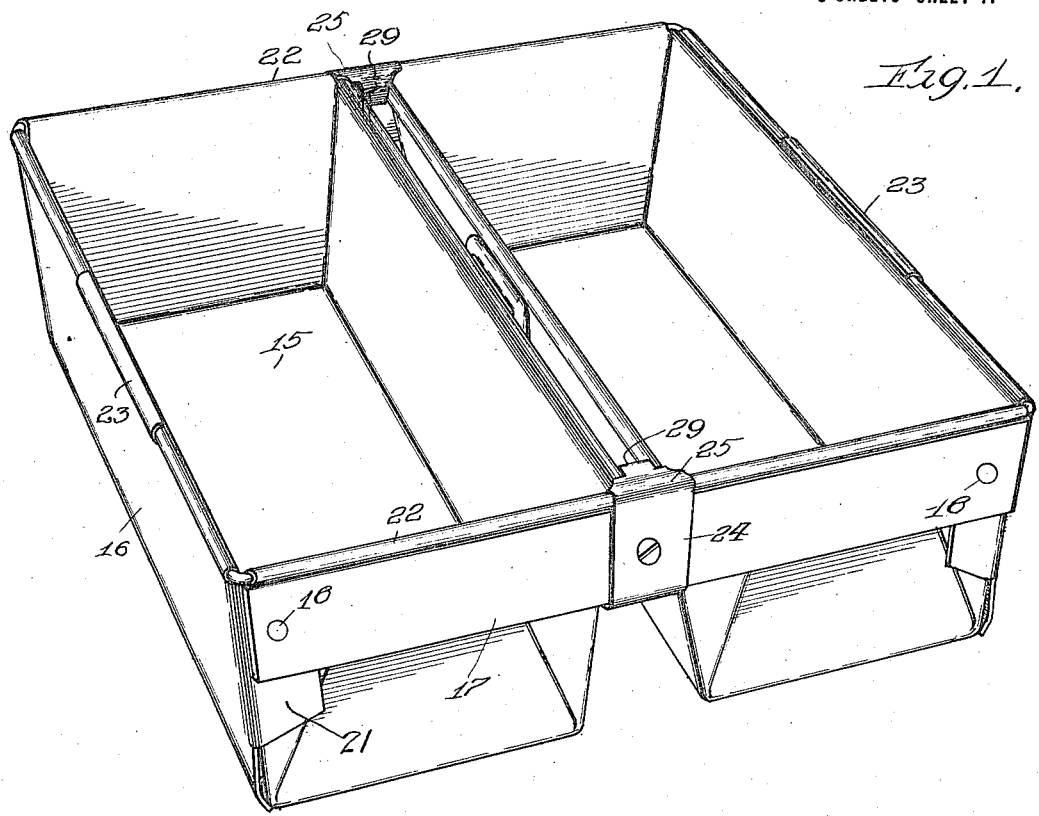
Figure 1 is a perspective view of a series of pans comprising two individual pans embodying our invention.
Figure 2:
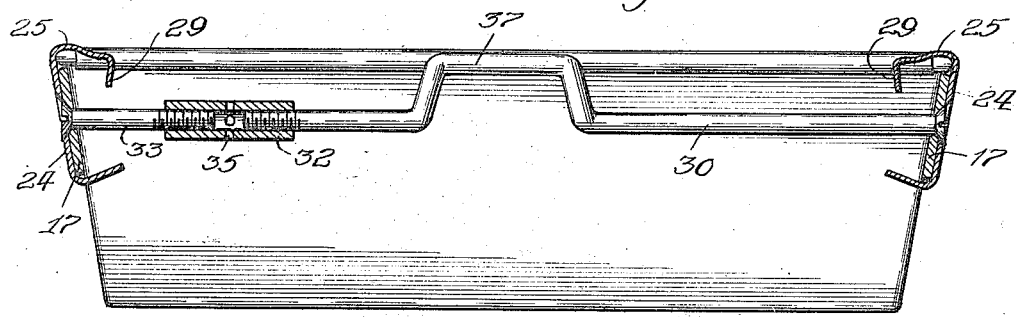
Fig. 2 is a section of the same taken through the frame between the pans.
Figure 3:
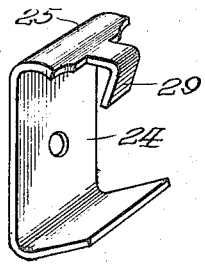
Fig. 3 is an enlarged perspective view of one of the members used for holding the pans to the frame.

Referring more particularly to the drawings, we have shown a plurality of individual baking pans 15 removably held in a frame. In Figs. 1 and 14 we have shown a series consisting of two individual pans 15, and in Figs. 12 and 13 we have shown a series consisting of four individual pans. It is therefore evident that any desired number of individual pans may be removably held in a frame in accordance with our invention.

The frame of our construction preferably comprises two end bars 16 and two side bars 17. The end bars are shown as bent around under the side bars and riveted thereto by means of rivets 18, but any other manner of securing the bars together may be restored to when so desired. In Fig. 10 we have shown two of the bars secured together by means of a screw 19 passing through one bar and threaded in the other. In Fig. 6 we have shown end bars 16 and side bars 17 formed of an integral piece riveted together by a rivet 20 where the ends of the integral piece engage each other. From this it is evident that the end bars and side bars may be made up of one or more pieces as desirable and secured together in any preferred manner. We preferably provide protecting plates 21 formed integrally with the end bars 16, as clearly shown in Figs. 1 and 14. However, when so desired these protecting plates 21 may be dispensed with, as indicated in Fig. 6. In the latter case the end bars 16 are of substantially the same width as side bars 17.

The end bars 16 are formed in lengths corresponding to the lengths of the pans 15 so that the end rims 22 of the pans will rest on the side bars 17. The side bars 17 are formed in lengths corresponding to the number of pans it is desired to hold in a series, thus in Fig. 1 the side bars are of lengths to accommodate two pans, and in Fig. 12 they are of lengths to accommodate four pans. The pans 15 may be held in the frames in any desirable manner. One form comprises providing projections 23 formed integrally on the end bars 16, as indicated in Figs. 1 and 7, or formed on plates riveted to bars 16 by rivets 23' (see Fig. 9), for holding the remote sides of the end pans of the series, and plates 24 locked to bars 17, which have bent over portions 25 for engaging adjacent corners of the pans. Thus in this form the pans are held in the frame by the projections 23 and bent over portions 25 of locking plates 24, as shown in Figs. 1, 2, 3, 4, 12 and 13, while in Figs. 11 and 14 we have shown a slightly different means for locking the pans in the frame. In this latter form one of the side bars 17 is provided with its edge portion 26 disposed around all of the ends of the pans 15 at one side of the frame, thereby holding such ends tightly against such side bar 17. At the other side of the frame a plate 27 is removably held against the other side bar 17 and is provided with an edge portion 28 extending around on the rims of the pans which lie on the last mentioned side bar 17. On the edges 26 are provided projections 29 which engage between the adjacent end portions of the pans to space the latter apart. The edge portion 28 of plate 27 is also provided with projections 29 which facilitate spacing the pans apart in order to permit a circulation of hot air between the pans in the process of baking.

In the form of holding means for the pans shown in Figs. 1 and 12, the projections 25 of the plates 24 are also provided with projections 29 which space the pans 15 apart in the frames.

In order to prevent the side bars 17 from spreading and allowing the pans 15 to get out of proper position, we provide one or more tie rods which extend from one bar 17 to the other of the frame. This tie rod comprises a rod 30 having a head 31 at one end and threaded in a collar 32 at its other end, and a screw 33 having a head 34 at one end and threaded into the collar 32 at its other end. Thus upon reference to Figs. 2 to 11 it will be noted that the rods 30 and screws 33 pass through the side bars 17 with their heads engaging against the side bars to firmly clamp such side bars against the ends of the pans 15. The collar 32 may be provided with perforations 35 by means of which an instrument, not shown, may be inserted therein to hold the collar against rotation while adjusting the rod 30 or screw 33 into and out of operative position. The screw 33 and rod 30 also pass through the plates 24 and 27 to removably hold these plates in operative positions to lock the pans in the frame, as clearly indicated in Figs. 1, 2, 11 and 14. In some cases it will be desirable to provide a tie rod between each adjacent edge of the pans in the series, and in other cases some of the tie rods may be dispensed with, as indicated in Fig. 12, and screws 36 used to hold corresponding plates 24 in operative position on the frames. Also in the form shown in Figs. 11 and 14 the ends of plate 27 are preferably held by screws 36, while the central portion of said frame is held by a tie rod comprising a rod 30 and screw 33 to prevent spreading of the frame.

In order to remove one or more of the pans of a series in the form shown in Figs. 11 and 14 the plate 27 is removed and the ends of the pans 15 adjacent such plate raised and the other end of such pan or pans slid out from under the edge portion 26 to free the pan. In order to replace a pan, one end of the latter is inserted under edge portion 26 and then the pan lowered into the frame until its other end engages the other side bars 17, when the plate 27 is again secured in position to lock the pan in the frame. In order to remove a pan from the form shown in Figs. 1 and 2 one of the tie rods is removed to loosen the two plates 24 which were held by such tie rod whereupon the edge of a pan 15 which was held by said plates 24 is lifted upwardly and the other edge of the pan slid out from under the portion 23, if it is a series of two pans, and if a series of four pans, such other edge is slid out from under the plates 24 which hold such other edge to free the pan. In replacing a pan, the converse order is adhered to.

The heads 31 and 34 are preferably countersunk in their engaging members so that they do not protrude to catch on other like series of pans or stationary objects. The plates 24 may also be set in the side bars 16 in recesses 16' shown in Fig. 6 when so desired, but such plates are usually quite thin and would not be likely to catch on other objects, and in some instances the frame need not be provided with recesses 16', as clearly indicated in Fig. 5. It is desirable to provide all of the means secured to the end bars 16 and side bars 17 so that there will be no rough portions to catch on other objects.

Figure 4:
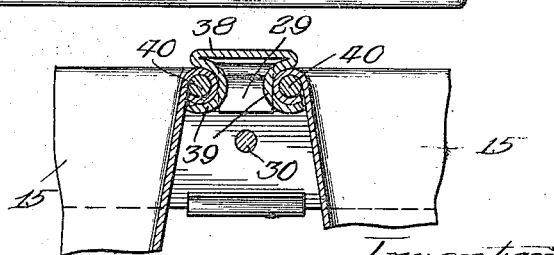
Fig. 4 is an enlarged fragmental view showing a slight modification of the tie rod and means for spacing intermediate portions of the pans apart.

We preferably provide means for spacing the central portions of adjacent edges of the pans apart also. One form of such a spacing means is provided by offsetting rod 30 of Fig. 2 as indicated at 37. This offset portion extends upwardly and is disposed between the adjacent rims of the pans 15, thereby preventing the latter from being pressed or otherwise forced together. Another means for holding these central portions of adjacent rims apart is indicated in Figs. 4 and 11. This latter form comprises a strip of sheet metal having a central portion 38 and end portions 39 bent back on the central portion and curved somewhat more than half way around on the rims 40 of two adjacent pans 15, thereby securely holding the central portions of said adjacent edges both from movement apart and toward each other. Where the offset portion 37 or the sheet metal strip 38 is employed, the spacing means is preferably quite short, as clearly indicated in Figs. 1 and 11, so that very little of the space between the pans will be closed off by such spacing member. This prevents interfering with the circulation of heated air between the pans in use. In some series it may be desirable to entirely dispense with spacing members for the intermediate portions of the rims 40 of the pans 15. This construction is clearly indicated in Fig. 12. Where the sheet metal strip 38 is employed, the tie rod 30 is preferably straight, as indicated in Fig. 11.

While we have illustrated and described the preferred forms of our invention, we do not desire to be limited to the precise details set forth, but desire to avail ourselves of such variations and changes as come within the scope of the appended claims.

We claim:—

1. In combination, a substantially rectangular frame; a plurality of pans disposed in the frame with portions engaging the latter; locking members engaging the frame and corners of the pans; and tying members removably securing the locking members to the frame and holding said locking members in clamping relations with the pans.

2. In combination, a substantially rectangular frame; a plurality of pans disposed in the frame with portions engaging the latter; locking members engaging the frame and corners of the pans; and tying members passing between the pans removably securing the locking members to the frame and holding the sides of the latter against spreading.

3. In combination, a substantially rectangular frame; a plurality of pans disposed in the frame with portions engaging the latter; locking members engaging the frame and corners of the pans; tying members removably securing the locking members to the frame; and connections between certain of the tying members holding the sides of the frame against movement away from each other.

4. In combination, a substantially rectangular frame; a plurality of pans disposed in the frame with their rim portions resting on the frame; members pressing on the pan rims for locking the pans in the frame; and tie rods extending between the adjacent edges of the pans and holding the members in clamping engagement with the pan rims.

5. In combination, a substantially rectangular frame; a plurality of pans disposed in the frame with their rim portions resting on the frame; members pressing on the pan rims for locking the pans in the frame; and tie rods extending between the adjacent edges of the pans and holding the members in clamping engagement with the pan rims, there being portions of the rods disposed between adjacent edges of the pans spacing the intermediate parts of said adjacent edges apart.

6. In combination, a substantially rectangular frame; a series of baking pans having wired rims and disposed in the frame with the rims resting on the frame; projections at the ends of the frame engaging the remote sides of the end pans of the series; members engaging the frame and adjacent corners of the pans; and tie rods extending between the pans and holding said members in positions for clamping the pans tightly in the frame.

7. In combination, a substantially rectangular frame; a series of baking pans having wired rims and disposed in the frame with the rims resting on the frame; projections at the ends of the frame engaging the remote sides of the end pans of the series; members engaging the frame and adjacent corners of the pans; and ties rods extending between the pans and holding said members in positions for clamping the pans tightly in the frame, said members and said rods spacing the pans apart in the frame.

8. In combination, a substantially rectangular frame; a series of baking pans having wired rims and disposed in the frame with the rims resting on the frame; projections at the ends of the frame engaging the remote sides of the end pans of the series; members engaging the frame and adjacent corners of the pans; tie rods extending between the pans and holding said members in positions for clamping the pans tightly in the frame; and means intermediate the ends of the adjacent edges of the pans spacing intermediate portions of said adjacent edges apart.

9. In combination, a frame; a plurality of baking pans in the frame, each of the baking pans having a rim resting on the upper edge of the frame; locking members engaging the frame and the pan rims; and bolts passing through the locking members and frame removably connecting the frame and locking members and clamping the pans on the upper edges of the frame.

In testimony whereof we have signed our names to this specification, in the presence of two subscribing witnesses, on this 23rd day of March, A. D. 1916.

EDWARD KATZINGER.
SIDNEY C. KATZINGER.

Witnesses:
A. L. SPRINKLE,
KATHRYN G. STRETCH.